United States Patent [19]

Duverger et al.

[11] Patent Number: 4,937,523
[45] Date of Patent: Jun. 26, 1990

[54] METHOD AND SYSTEM FOR EXPLOITING THE SIGNALS OF LINEAR INDUCTIVE SENSORS, WHICH SYSTEM IS ADAPTABLE FOR DIFFERENT SENSOR STRUCTURES

[75] Inventors: Thierry Duverger; Pierre C. Rolland, both of Toulouse, France

[73] Assignee: Aerospatiale Societe Nationale Industrielle, Paris, France

[21] Appl. No.: 360,153

[22] Filed: May 31, 1989

[30] Foreign Application Priority Data

Jun. 17, 1988 [FR] France ................... 88 08163

[51] Int. Cl.$^5$ .............. G01B 7/14; G08C 19/08; H01F 21/06
[52] U.S. Cl. .................. 324/207.18; 336/45; 336/130; 318/656; 340/870.36
[58] Field of Search .................. 324/207, 208; 340/870.34, 870.35, 870.36; 336/45, 130, 136; 318/656–660

[56] References Cited

FOREIGN PATENT DOCUMENTS 0215724 3/1987 European Pat. Off. .
2524975 12/1976 Fed. Rep. of Germany .
2068124 5/1981 United Kingdom .

OTHER PUBLICATIONS

Patent Abstracts of Japan, vol. 6, No. 8, (Jan. 19, 1982), (P-98) (888), Abstracts 110.

Primary Examiner—Reinhard J. Eisenzopf
Assistant Examiner—Walter E. Snow
Attorney, Agent, or Firm—Fisher, Christen & Sabol

[57] ABSTRACT

A method and system for exploiting the signals of linear inductive sensors, which system is adaptable for different sensor structures. The system is formed of a linear inductive displacement sensor provided with a primary coil and two identical symmetrical secondary coils which are in series and in antiphase. A mobile core and an alternative voltage source are mounted between the terminals of the primary coil wherein the amplitude of the voltage at the primary coil terminals is greater than the maximum amplitude of the voltage that can be taken at the secondary coil terminals. The method has the steps of forming the sum of the two alternative voltages present at the primary and secondary coils. These voltages are rectified by means of full wave rectifying and deriving the difference between the sum of recitified voltages. A continuous means valve corresponding to the difference is also derived.

5 Claims, 5 Drawing Sheets

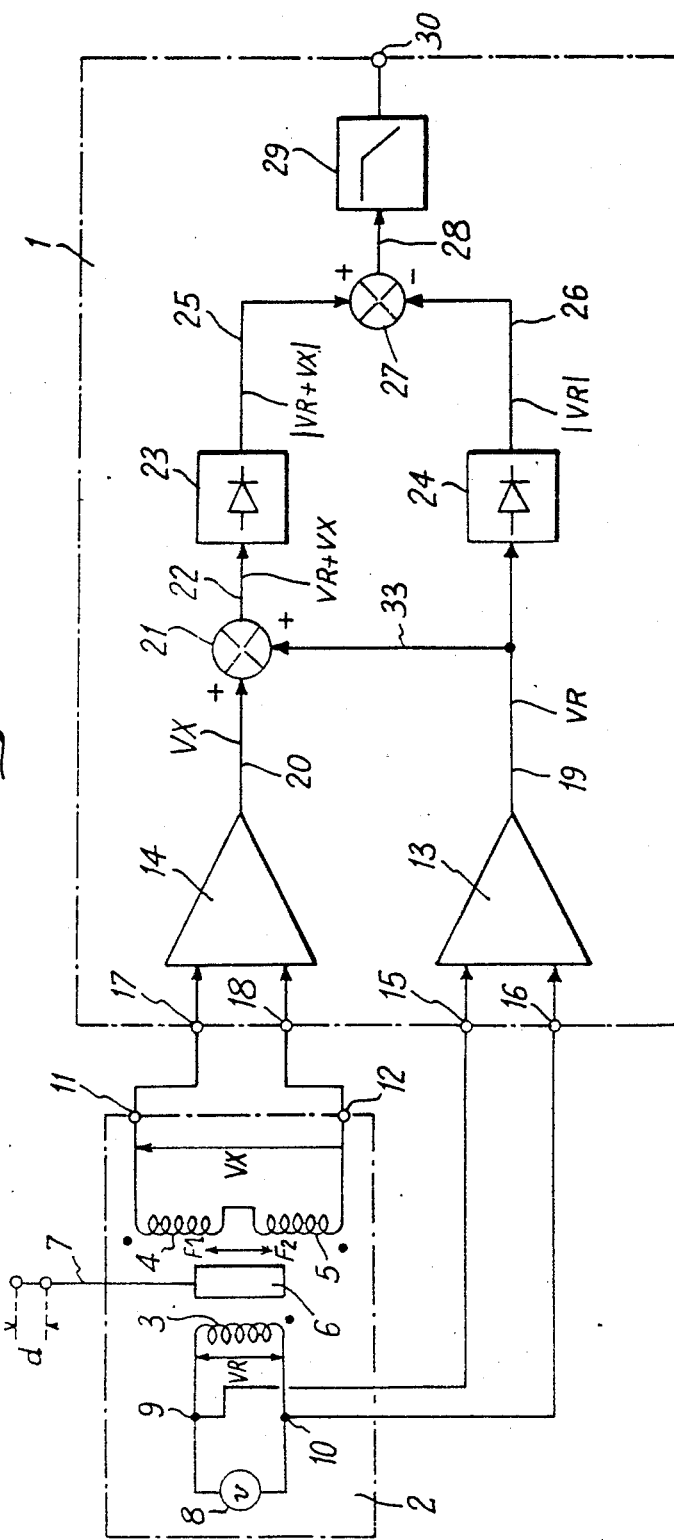

METHOD AND SYSTEM FOR EXPLOITING THE SIGNALS OF LINEAR INDUCTIVE SENSORS, WHICH SYSTEM IS ADAPTABLE FOR DIFFERENT SENSOR STRUCTURES

BACKGROUND OF THE INVENTION

The present invention concerns a method and system to exploit signals derived from linear inductive displacement sensors.

Linear inductive sensors are very commonly currently used, especially as regards angular attitude sensors and rectilinear displacement sensors. Based on the variational principle of an inductive resistor, they present the advantage of possessing extremely good linearity and excellent resolution.

Linear inductive sensors are generally preferred to other non-linear types of sensors; in fact, the linear relation, which links the output signal to displacement, allows for simpler exploitation of the signal. Moreover, their conception renders these sensors sturdy and suitable for being installed in harsh environments.

The most elementary embodiment of this type of sensor includes a primary winding and a secondary winding. The displacement of a magnetic core allows for an inductance variation which induces a secondary voltage variation.

In this type of embodiment, the signal delivered by the secondary is sensitive to variations of the primary voltage, the variation of the winding ratio according to the temperature, and to its constructional inaccuracy.

So as to minimize influence quantities, new sensors have been developed; these have been conceived on the basis of the principle relating to differential methods. The embodiment of these sensors comprises a primary winding and two secondary windings in antiphase. At this stage, it is possible to distinguish two types of sensors, namely 4-wire sensors and 6-wire sensors.

In the 6-wire sensors, the two secondary windings are independent. On the other hand, the two secondary windings of the 4-wire sensors are connected in series so as to be electrically in opposition.

Thus, it can be seen that, because of the structural differences of these sensors, the systems for exploiting the signals they generate are specific to a particular structure and may not be used for a sensor with a different structure.

SUMMARY OF THE INVENTION

The object of the present invention is to overcome this drawback and to provide a system for exploiting the signals of linear inductive sensors and appropriate to the structure of said sensors. According to the invention, this result can be attained by virtue of the fact that the Applicant has discovered an original method and system for processing signals generated by a sensor with two series secondaries, this system having a particular structure enabling it to be adapted to sensors with different structures.

To this end, the invention offers a method for exploiting signals generated by a linear inductive displacement sensor is provided with a primary, coil two identical symmetrical secondary coils in antiphase and connected in series and a mobile core. The invention being distinctive in that, as the amplitude of the voltage at the terminals of said primary is greater than the maximum amplitude able to be taken by the voltage at the terminals of the series connection of said secondaries:

the sum is formed of the two alternating voltages respectively present at the terminals of said primary and at the terminals of the series connection of said secondaries;

said sum of alternating voltages is double-alternation recitified;

the alternating voltage present at the terminals of the primary is double-alternation rectified;

the difference is formed between said sum of rectified voltages and said rectified voltage at the terminals of the primary; and the mean continuous value corresponding to said difference is formed.

As shall be clearly shown by the following, the amplitude and the sign of said mean continuous value are respectively characteristics of the amplitude and direction of displacement of the core.

In order to implement this method, the invention provides a remarkable system in that it comprises:

first input means for a first alternating voltage (the primary voltage);

second input means for a second alternating voltage (the secondary voltage);

first addition means so as to form the sum of said first and second alternating voltages;

first means for double-alternation rectification of said sum;

second means for double-alternation rectification of said first alternating voltage;

substraction means so as to form the difference between said rectified sum and said first rectified voltage; and first integration means so as to give the mean continuous value of said difference.

Preferably, said system comprises floating input means for said alternating voltages respectively present at the terminals of said primary and at the terminals of the series connection of said secondaries.

This is particularly advantageous as one of said floating input means is also used to form the sum of the two alternating voltages respectively present at the terminals of said primary and at the terminals of the series connection of said secondaries.

So as to be able to allow for exploitation of signals generated by linear inductive displacement sensors with a single secondary or two independent secondaries, it is advantageous that the system according to the invention also comprises:

a first switch disposed between said second rectification means and said substraction means;

a circuit arm connected to the output of said first rectification means and comprising in series a second switch, second addition means and second integration means intended to give a mean continuous value;

a link or coupling between the output of said second rectification means and said second addition means; and a third switch controlling the feeding of said first alternating voltage to said first addition means.

As shall be seen from the following description, it is possible to process the signals of linear inductive sensors with one secondary (4 wires), with two independent secondaries (6 wires) or with two series secondaries (4 wires) by connecting said sensors to said input means and by suitably activating said first, second and third switches.

BRIEF DESCRIPTION OF THE DRAWINGS

The figures of the accompanying drawing clearly show how the invention can be embodied. On these figures, identical references denote identical elements.

FIG. 1 is the synoptic diagram of an embodiment of the system according to the invention and intended for a sensor with two series secondaries.

The temporal diagrams of FIGS. 2a to 2g and 3a to 3g illustrate the functioning of the system of FIG. 1.

Figure 4:
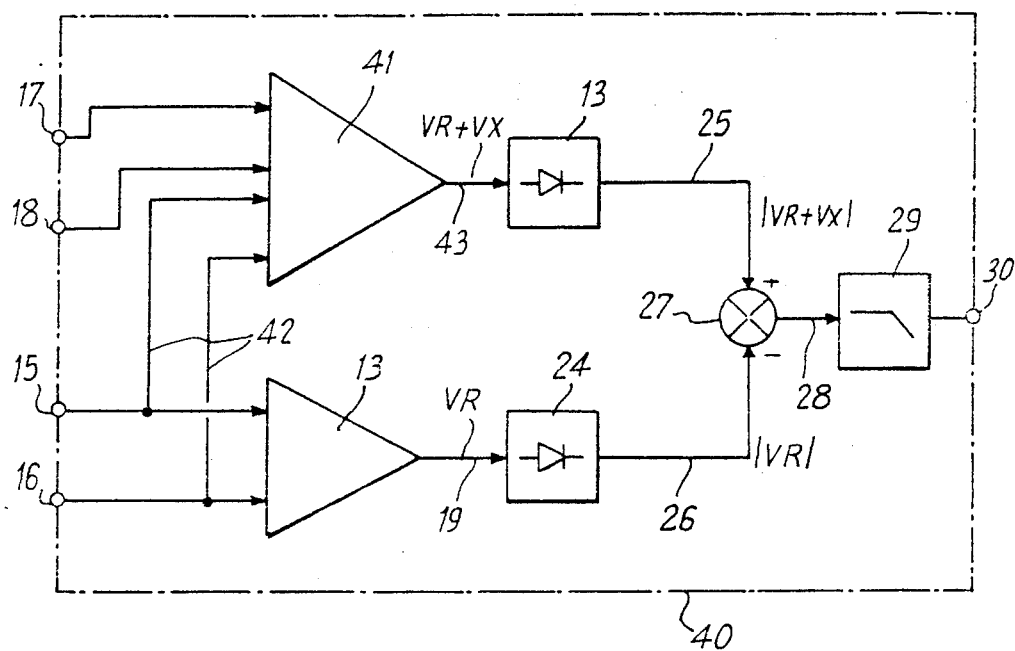

FIG. 4 is the synoptic diagram of an embodiment variant of the system according to the invention.

Figure 5:
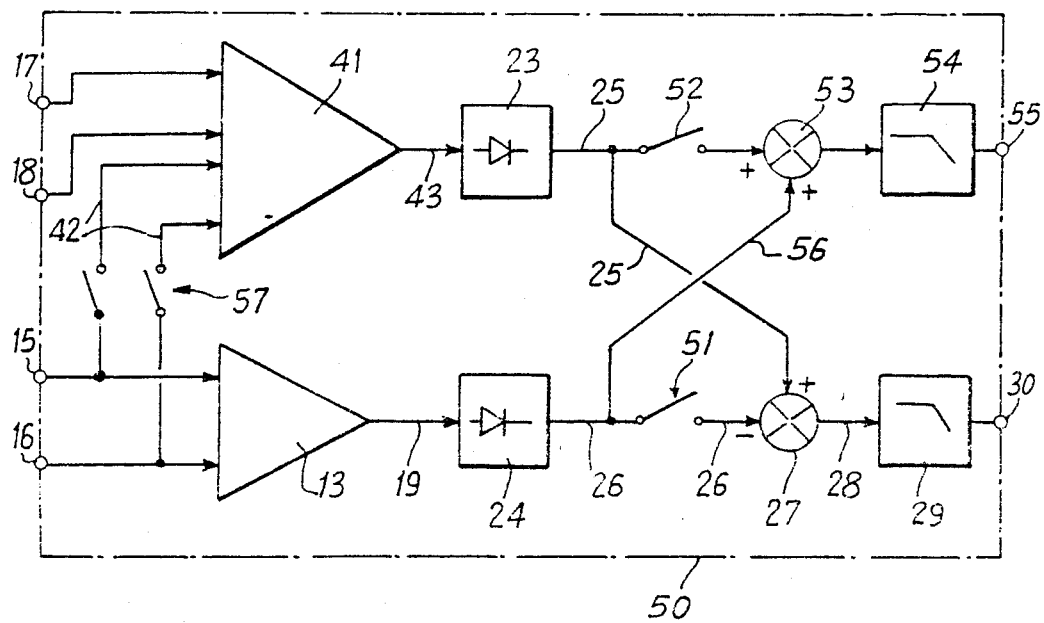

FIG. 5 is the synoptic diagram of a system according to the invention allowing for the processing of signals derived from sensors with one or two secondaries (in series or independent).

Figure 6:
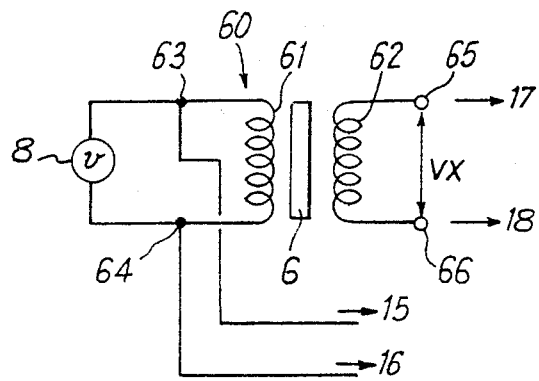

FIG. 6 gives the diagram of a linear inductive sensor common to a single secondary.

Figure 7:
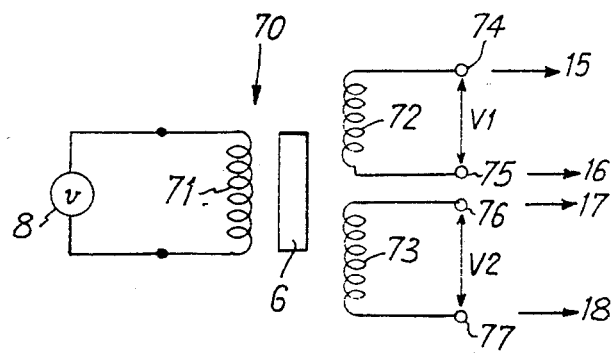

FIG. 7 gives the diagram of a linear inductive sensor common to two independent secondaries.

The system 1, according to the invention and represented on FIG. 1, is designed to exploit the signals issued from an inductive displacement sensor 2 of the linear type, namely supplying an electric signal whose amplitude is proportional to the displacement.

This inductive sensor 2 comprises a primary coil 3 associated with two identical secondary coils 4 and 5. Between the primary 3 and the secondaries 4 and 5, a mobile core 6 is disposed able to be joined by a link 7 to an object (not represented) for which it is desired to know the displacement; said secondaries 4 and 5 are disposed in such a way that, in the absence of said core 6, the voltages induced there by the primary 3 are of equal amplitude and in antiphase.

An alternating voltage source 8 is mounted between the terminals 9 and 10 of the primary 3 so that the latter is the seat or receiver of an alternating primary voltage VR.

The two secondaries 4 and 5 are series connected so that the voltage VX, which appears at the terminals 11 and 12 under the action of the primary voltage VR, is the algebraic sum of the voltages induced in each of said secondaries. For a median position of said core 6, these two induced voltages are equal and opposed so that the voltage VX is nil. By construction, the maximum amplitude of VX is less than that of VR.

The exploitation system 1 comprises two differential input stages 13 and 14. The terminals 15 and 16 of the differential stage 13 are intended to be connected to the terminals 9 and 10 of the primary 3, whereas the terminals 17 and 18 of the differential stage 14 are intended to be connected to the terminals 11 and 12 of the series connected secondaries 4 and 5.

The outputs 19 and 20 of said input differential stages 13 and 14 are connected to an adding device 21 whose output 22 is joined to a full wave rectifier 23. In addition, the output 19 of the stage 13 is connected to another full wave rectifier 24.

The output 25 of the rectifier 23 is connected to the positive input of a subtracting device 27 whose negative input is joined to the output of the rectifier 24.

The output 28 of the subtracting device 27 is joined to a filter 29 capable of supplying at its output 20 the mean value of the continuous signal it receives at its input 28.

There now follows an explanation of the functioning of the system of FIG. 1 with reference to FIGS. 2a to 2g and 3a to 3g.

Figure 2A:
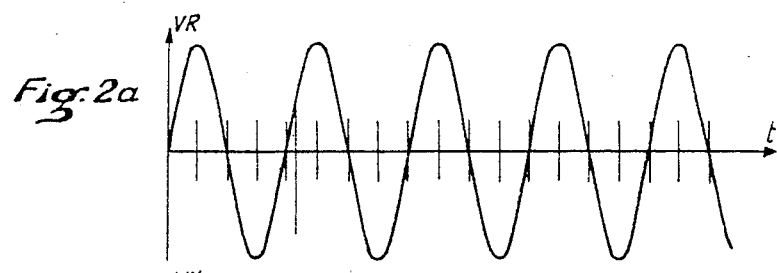
Figure 2B:
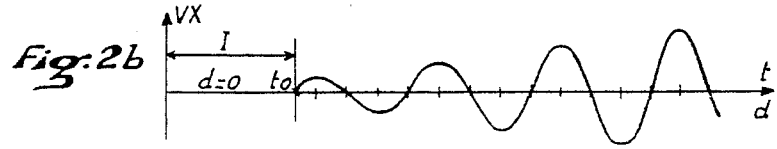
Figure 2C:
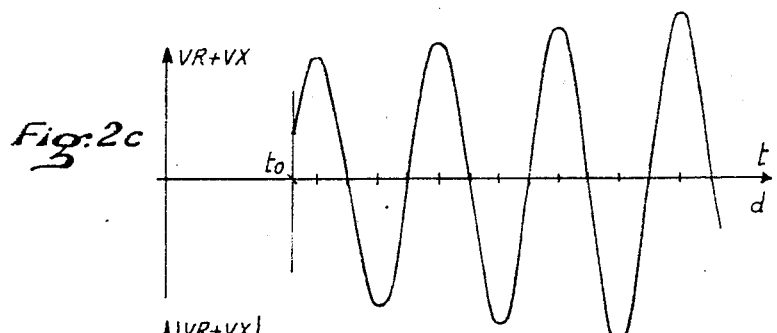

The alternating source 8 generates the primary voltage VR in the primary 3 (see FIG. 2a). Whilst the core 6 is in its median position, the voltages induced in the secondaries 4 and 5 are of equal amplitude, but in antiphase, so that the signal VX is nil (see zone I of FIG. 2b). Accordingly, the signal at the output 20 of the input stage 14 is also nil. As a result, the signal at the output 22 of the adding device is constituted by the single voltage VR. The subtracting device 27 thus carries out the subtraction of two identical rectified voltages, namely the rectified voltage VR noted |VR|. The signal appearing at the output 30 is therefore nil.

If at the instant t=to (see FIG. 2b), the magnetic core 6 is now moved to draw close to the secondary 4 (assumed to be in phase with the primary 3) and be distanced from the secondary 5 (assumed to be in antiphase with the primary 3), magnetic coupling is gradually increased between the primary 3 and the secondary 4, and magnetic coupling is gradually reduced between the primary 3 and the secondary 5. Accordingly, as the displacement d gradually increases in the direction of the arrow F1 from the median position of the core 6 between the terminals 11 and 12, a voltage VX appears in phase with the voltage VR, but whose amplitude gradually increases (see FIG. 2b). As a result, the sum VR+VX appearing on the output 22 of the adding device 21 is thus also in phase with VR and presents an increasing amplitude with d (see FIG. 2c).

Figure 2D:
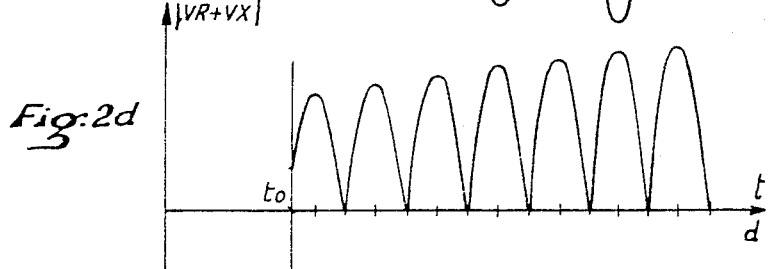

At the output 25 of the full wave rectifier 23, a rectified voltage VR+VX, noted |VR+VX|, thus appears and illustrated on FIG. 2d. This voltage |VR+VX| is thus constituted by a series of positive alternations of increasing amplitude.

Figure 2E:
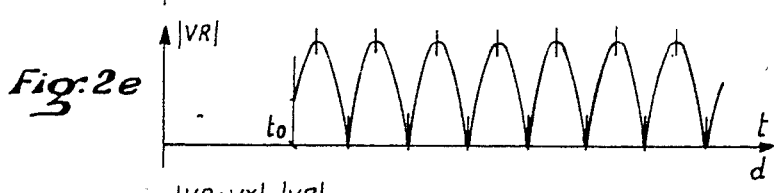

In the subtracting device 27, the rectified voltage VR, shown by FIG. 2e and noted |VR|, is subtracted from the voltage |VR+VX|. Thus, at the output 28 of said subtracting device the d.c. voltage |VR+VX|−|VR| is obtained, as shown by FIG. 2f, and constituted by a series of positive alternations of progressively increasing amplitude (see FIG. 2f).

Figure 2F:
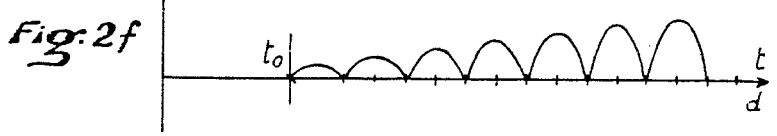
Figure 2G:

The filter 29 thus supplies at its output 30 the positive and increasing continuous signal 31, as shown by FIG. 2g, and formed by the mean value of the signal |VR+VX|−|VR| of FIG. 2f.

Thus, it can be seen that the displacement of the magnetic core 6 in the direction of the arrow F1 is expressed by the appearance of a positive continuous and increasing signal 31 on the terminal 30. The amplitude of this signal 31 is representative of the amplitude of the displacement d in the direction of the arrow F1.

Conversely, if at the instant t=to (see FIG. 3b), the magnetic core 6 is displaced (see the arrow F2 of FIG. 1) in order to move it away from the secondary 4 (in phase with the primary 3) and bring it closer to the secondary 5 (in antiphase with the primary 3), magnetic coupling is increased between the primary 3 and the secondary 5 and progressively reduces magnetic coupling between said primary 3 and the secondary 4. Accordingly, as the displacement d increases in the direction of the arrow F2 from the median portion of the core 6 between the terminals 11 and 12, a voltage VX appears in antiphase with the voltage VR, but whose amplitude progressively increases (see FIG. 3b). Since the amplitude of VR (FIG. 3a) is selected so as to be greater than the maximum amplitude able to be taken by VX, the sum VR+VX of the two voltages VR and VX in antiphase is in phase with VR, but presents a decreasing amplitude with d (see FIG. 3c). Such a signal VR+VX appears at the output 22 of the adding device 21.

Figure 3A:
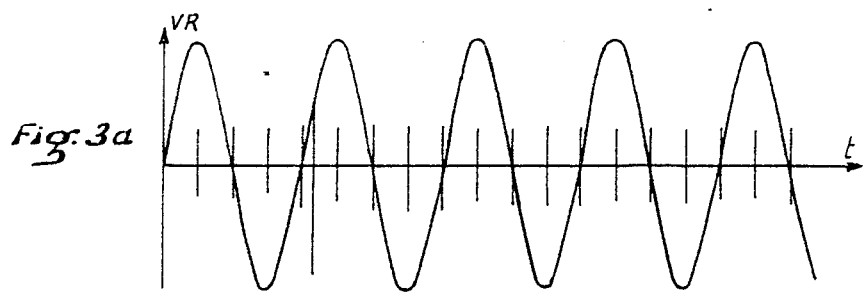
Figure 3B:
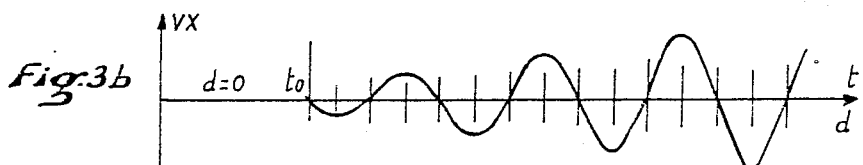
Figure 3C:
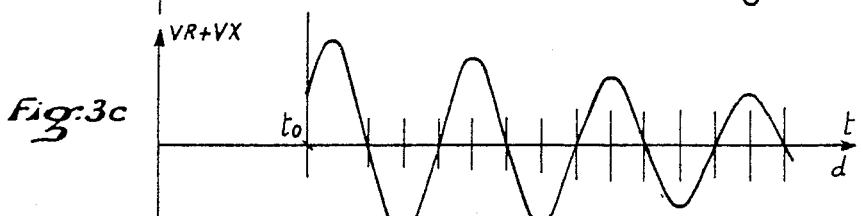
Figure 3D:
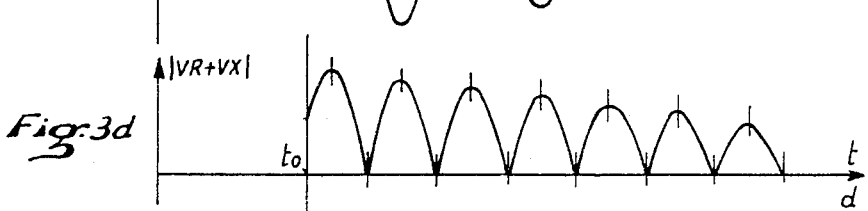
Figure 3E:
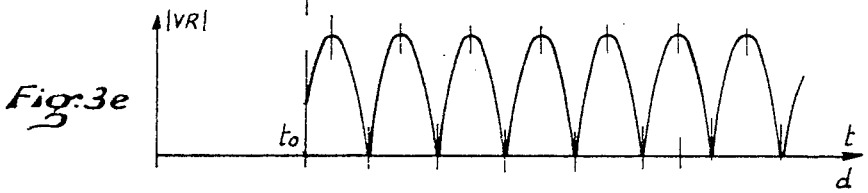

The rectified voltages |VR+VX| and |VR| respectively appearing at the outputs 25 and 26 of the rectifiers 23 and 25 are respectively shown by FIGS. 3d and 3e; the voltage |VR+VX| is constituted by a series of positive alternations but of decreasing amplitude, whereas clearing the voltage |VR| is constituted by a series of positive alternations of constant amplitude. Moreover, the amplitude of the alternations of |VR| is much greater than those of the alternations of |VR+VX|.

Figure 3F:
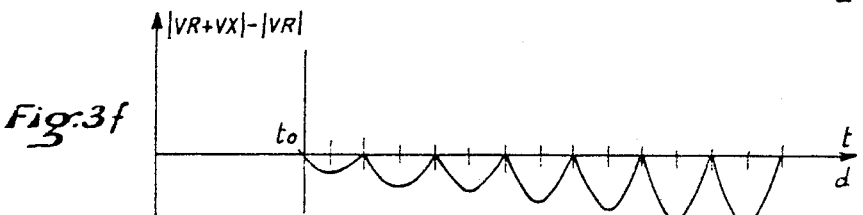
Figure 3G:
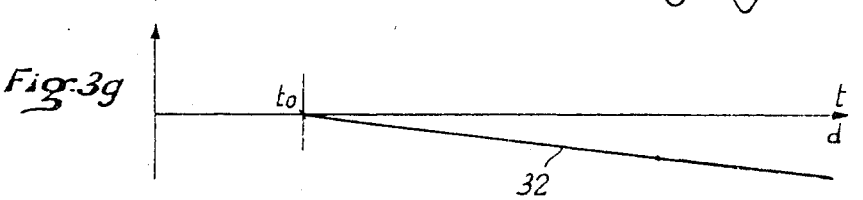

Accordingly, at the output 28 of the subtracting device 27, the d.c. voltage |VR+VX|−|VR|, shown on FIG. 3f, is constituted by a series of negative alternations of increasing amplitude. The filter 29 thus supplies at its output 30 the continuous negative decreasing signal 32, as shown by FIG. 3g, and formed by the mean value of the signal |VR+VX|−|VR| of FIG. 3f.

Thus, it can be seen that displacement of the magnetic core 6 in the direction of the arrow F2 is expressed by the appearance on the terminal 30 of a negative continuous decreasing signal 32 whose amplitude is representative of the displacement d in the direction of the arrow F2.

Thus, at the output 30 of the filter 29, a signal (31 or 32) appears whose amplitude is representative of the size of the displacement d and whose sign is representative of the direction (F1 or F2) of said displacement.

FIG. 4 shows an embodiment variant 40 of the system according to the present invention. This embodiment variant shows the elements 13, 15-19 and 23-30 described with reference to FIG. 1. As one can see, the differential input stage 14 and the adding device 21 have been replaced by a double differential input stage 41 receiving both the voltage VX from the terminals 17 and 18 and the voltage VR from the terminals 15 and 16. Accordingly, the link 33 between the output 19 of the differential stage 13 and the adding device 21 have been suppressed and replaced by a link 42 between the terminals 15 and 16 and the double input stage 41. At the output 43 of the latter, the sum VR+VX appears directly. This output 43 is connected to the double-alternation rectifier 23 instead of the output 22 of the adding device 21.

Of course, the functioning of the system 40 is similar to that of the system 1 described with reference to FIGS. 2a to 2g and 3a to 3g.

The embodiment variant 50 represented on FIG. 5 shows the elements 13, 15-19, 23-30 and 41-43 of the system of FIG. 4. In addition, this system 50 comprises:
   a switch 51 inserted in the link 26 between the rectifier 24 and the subtracting device 27;
   a circuit arm 52-55 connecting the output 25 of the rectifier 23 to a supplementary terminal 55 and comprising in series a switch 52, an adding device 53 and an averaging filter 54;
   a link 56 between the output 26 of the rectifier and the adding device 53; and
   a switch system 57 able to open the link 42.

It can easily be seen that when the switch 51 is closed at the same time when the switches 52 and 57 are closed, the system 50 of FIG. 5 is identical to that of FIG. 4 and thus functions in a similar way. In this configuration, the system 50 is thus suitable for exploiting the signals of an inductive sensor with two series secondaries, as illustrated on FIG. 1. In this case, a continuous signal appears which is representative of the rectified voltage |VR| on the terminal 55 by virtue of the link 56 and the action of the filter 54 (similar to the filter 29). Thus, it is possible to place a divider (not represented) between the terminals 30 and 55 so as to form the ratio of the signals respectively representative of |VX| and |VR| so as to be freed from the effect of any possible variations of the voltage generated by the source 8.

FIG. 6 shows a further known type of inductive sensor comprising a primary 61 and a single secondary 62. The primary 61 is fed between its terminals 63 and 64 by the alternating source 8 so that an alternating voltage VX, representative of the displacement of the core 6 disposed between said primary and secondary, appears at the terminals 65 and 66 of said secondary 62. The terminals 63 to 66 of the sensor are respectively connected to the terminals 15 to 18 of the system 50. In the latter, the switches 51 and 52 are kept open, whereas the switch 57 is open. Accordingly, a continuous signal representative of the displacement appears on the terminal 30, whereas a continuous signal representative of the voltage VR between the terminals 63 and 64 of the primary 61 appears on the terminal 55. The system 50 thus makes it possible to know said displacement and subsequently to carry out the ratio of the signals appearing at the terminals 30 and 55, as mentioned above. The terminals 63 and 64 could subsequently be connected to the terminals 17 and 18 and the terminals 65 and 66 to the terminals 15 and 16. Moreover, it is not essential to have the link between the terminals 63 and 64 and the terminals 15, 16 or 17, 18, so that it is possible to simultaneously connect two sensors 60 to the system 50. In this case, a continuous signal representative of the displacement of a core 6 of a sensor 60 appears at each of the terminals 30 and 55.

The inductive sensor 70, of a known type and shown on FIG. 7, comprises a primary 71 and two independent secondaries 72 and 73. The primary 71 is fed between its terminals by an alternating source 8 so that the alternating voltages V1 and V2, representative of displacement of the core 6 disposed between said primary and secondary, respectively appear at the terminals 74 and 75 of the secondary 72 and at the terminals 76 and 77 of the secondary 73. The terminals 74 and 77 are respectively connected to the terminals 15 to 18 of the system 50. In the latter, the switches 51 and 52 are kept closed and the switch 57 is kept open.

Accordingly, a continuous signal representative of the difference |V1|−|V2| between the rectified voltages |V1| and |V2| appears on the terminal 30, whereas on the terminal 55, there appears the continuous signal representative of the sum |V1|+|V2| of said rectified voltages. It is a simple matter to verify that the ratio of these two continuous signals, namely the one concerning the sum and the other the difference, is representative of the displacement d of the core 6. Accordingly, a divider (not shown) disposed between the terminals 30 and 55 also makes it possible to know said displacement d.

What is claimed is:

1. A method for the exploitation of signals generated by a linear inductive displacement sensor provided with a primary coil, two identical symmetrical secondary coils connected in series and in antiphase, and a mobile core, an alternating voltage source being mounted between the terminals of said primary coil and the amplitude of said voltage at the terminals of said primary coil being greater than the maximum amplitude able to be taken by the voltage at the terminals of the series connection of said secondary coils, said method comprising the steps of:

(a) forming the sum of the two alternating voltages, respectively, present at the terminals of said primary coil and at the terminals of the series connection of said secondary coils;
(b) full wave rectifying said sum of alternating voltages;
(c) full wave rectifying the alternating voltage present at the terminals of the primary coil;
(d) forming the difference between said sum of rectified voltages and said rectified voltage at the terminals of the primary coil; and
(e) forming the mean continuous value corresponding to said difference.

2. System for the exploitation of signals generated by a linear inductive displacement sensor provided with a primary coil, two identical symmetrical secondary coils connected in series and in antiphase, and a mobile core, an alternating voltage source being mounted between the terminals of said primary coil and the amplitude of the first voltage at the terminals of said primary coil being greater than the maximum amplitude able to be taken by the second voltage at the terminals of the series connection of said secondary coils, which comprise:

(a) first input means for said first alternating voltage present at the terminals of said primary coil;
(b) second input means for said second alternating voltage present at the terminals of said series connection of said secondary coils;
(c) first addition means connected to said first and second input means in order to form sum of said first and second alternating voltages;
(d) first means for full wave rectifying said sum;
(e) second means connected to said first input means for full wave rectifying said first alternating voltage;
(f) subtraction means in order to form the difference between said rectified sum and said first rectified voltage; and
(g) first integration means to give the mean continuous value of said difference.

3. System according to claim 2, comprising a floating input means for said first and second alternating voltages, respectively, present at the terminals of said primary coil and the terminals of the series connection of said secondary coils.

4. System according to claim 3 wherein one of said floating input means is used to form the sum of the two alternating voltages, respectively, present at the terminals of said primary coil and at the terminals of the series connection of said secondary coils.

5. System according to claim 2, which is also intended to allow for the exploitation of signals generated by linear inductive displacement sensors with one secondary coil or with two independent secondary coils, comprising:

(i) a first switch disposed between said second rectifying means and said subtraction means;
(ii) a circuit arm connected to the output of said first rectifying means and comprising in series a second switch, second addition means and second integration means so as to give a mean continuous value;
(iii) a link between the output of said second rectifying means and said second addition means; and
(iv) a third switch controlling the bringing of said first alternating voltage to said first addition means.

* * * * *